UNITED STATES PATENT OFFICE.

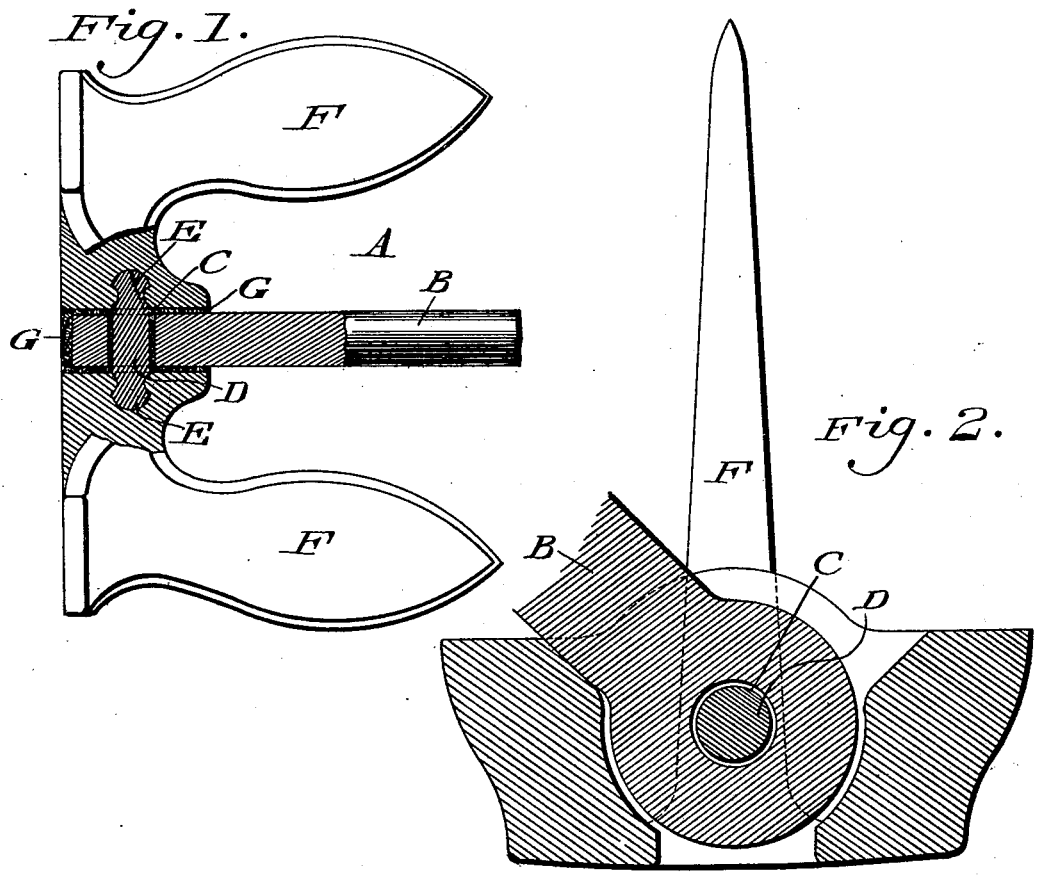

FREDERICK BALDT, SR., OF CHESTER, PENNSYLVANIA.

ANCHOR.

SPECIFICATION forming part of Letters Patent No. 677,619, dated July 2, 1901.

Application filed June 7, 1900. Serial No. 19,344. (No model.)

*To all whom it may concern:*

Be it known that I, FREDERICK BALDT, Sr., a citizen of the United States, residing at Chester, in the county of Delaware, State of Pennsylvania, have invented a new and useful Improvement in Anchors, which improvement is fully set forth in the following specification and accompanying drawings.

My invention consists of an improved construction of an anchor in which the flukes are integrally connected with the means for securing them to the shank.

It further consists of details of construction, all as will be hereinafter pointed out in the specification.

Figure 1 represents a partial side elevation and partial sectional view of an anchor embodying my invention. Fig. 2 represents a transverse sectional view thereof on an enlarged scale. Fig. 3 represents a sectional view showing a different construction from that in Figs. 1 and 2.

Similar letters of reference indicate corresponding parts in the figures.

Referring to the drawings, A designates an anchor having a shank B, having an opening C therein. D designates the axis of the flukes, which is formed of a pin inserted in said opening and having heads E on opposite ends. F designates the flukes of the anchor, which are integrally secured to said pin by casting after said pin has been placed in said opening, it being noticed that material G is placed around the end of the shank and between the pin and the walls of the opening C, that after the casting is accomplished the material is removed and a clear space is thus secured, so that the flukes can rotate on the shank, said pin D acting as the journal or axis.

In Fig. 3 I have shown a construction wherein the shank B is provided with an opening C, and the pin D, which comprises the axis of the flukes, is provided with washers J after it has been previously placed in the opening C; said washers J having the dovetail ribs K, with which the metal unites, forming a dovetailed joint when the flukes are cast, suitable material G being used, as before, to prevent the pin D and flukes from engaging with the shank B.

It will of course be apparent that various changes may be made in the construction that will come within the spirit of my invention, and I do not therefore desire to be limited in every instance to the exact forms as herein shown and described.

Having thus described my invention, what I claim as new, and desire to secure by Letters Patent, is—

1. A cast-metal anchor comprising a shank having an opening at one end, and a head provided with integral flukes, said head being cast about said shank and having a pin passing through said opening in said shank with a socket of sufficiently greater diameter to permit freedom of pivotal motion only between the shank and head, said pin forming the sole medium of connection between the shank and head.

2. In an anchor, a shank having an opening therein, flukes, and a pin passing through said opening in the shank, said pin being rigidly connected with said flukes and extending into and partially through the same, and having its ends embedded therein.

3. In an anchor, a shank, flukes, and a pin passing through said shank and partially through said flukes, and having heads on either end for engagement with said flukes by being embedded therein.

4. In an anchor, a shank having an opening therein, flukes, a pin passing through said opening, and means on said pin for engagement with said flukes.

FREDK. BALDT, SR.

Witnesses:
JNO. F. DICKSON,
CHAS. D. PENNELL.